United States Patent
Allgeier et al.

(10) Patent No.: US 7,672,900 B2
(45) Date of Patent: **\*Mar. 2, 2010**

(54) WRITE INPUT TRANSACTION APPARATUS AND METHOD

(75) Inventors: David M. Allgeier, Cumberland, OH (US); Floyd Jones, Jr., Cambridge, OH (US); Robert L. Protheroe, Cambridge, OH (US); John F. Crooks, Cambridge, OH (US)

(73) Assignee: NCR Corporation, Dayton, OH (US)

( * ) Notice: Subject to any disclaimer, the term of this patent is extended or adjusted under 35 U.S.C. 154(b) by 2196 days.

This patent is subject to a terminal disclaimer.

(21) Appl. No.: 10/300,118

(22) Filed: Nov. 20, 2002

(65) Prior Publication Data

US 2003/0074318 A1     Apr. 17, 2003

Related U.S. Application Data

(63) Continuation of application No. 07/575,096, filed on Aug. 30, 1990, now Pat. No. 6,539,363.

(51) Int. Cl.
*G06Q 40/00* (2006.01)

(52) U.S. Cl. .......................................... 705/39; 705/40

(58) Field of Classification Search ............. 705/39–40

See application file for complete search history.

(56) References Cited

U.S. PATENT DOCUMENTS

| | | | |
|---|---|---|---|
| 4,833,312 A | | 5/1989 | Minematsu et al. |
| 5,091,975 A | * | 2/1992 | Berger et al. ................. 382/123 |
| 5,315,504 A | * | 5/1994 | Lemble ........................ 700/90 |

OTHER PUBLICATIONS

Rodney Beatson, "Signature Dynamics in Personal Identification", 4th Worldwide Congress on Computer and Communications Security, Paris, Mar. 1986.

IBM Technical Disclosure Bulletin, "Personal Identification Terminal", vol. 31, No. 7, Dec. 1988.

\* cited by examiner

*Primary Examiner*—Thu Thao Havan
(74) *Attorney, Agent, or Firm*—Paul W. Martin

(57) ABSTRACT

A method and system for generating a completed payment document ready for signature in image form and enabling signature in image form, storing the image and providing a printed copy of the document including the signature. A write input device for showing the image and enabling the signature includes a transparent interactive digitizing element with writing stylus, a display module positioned beneath the digitizing element and visible therethrough, and optionally a magnetic stripe reader for providing document-related information for the display. The device is embodied in a system which also includes a point of sale terminal, a printer for printing records of transactions processed by the system and a controller operatively coupled to other elements of the system.

54 Claims, 13 Drawing Sheets

```
                    ANY STORE

6/7/90                              137124

SOCKS, WHITE
    1246794                             $7.00
    SHOES, BLACK
    4679174                             $73.45
    SUB                                 $80.45
    TAX                                 $ 5.23
    TOTAL                               $85.68
```

| CREDIT RECEIPT | ANY STORE<br>10 MAIN ST.<br>NY, NY 10003 |

| DATE | 01/04/80 |
| SUB | $80.45 |
| TAX | $5.23 |
| TOTAL | $85.68 |

EXPIRES 07/87
NO. 77996849436768
TEST ACCOUNT

SIGN HERE X

PAYMENT OF CHARGE SHALL BE MADE
UPON DEMAND OR PURSUANT TO
APPLICABLE CHARGE ACCOUNT

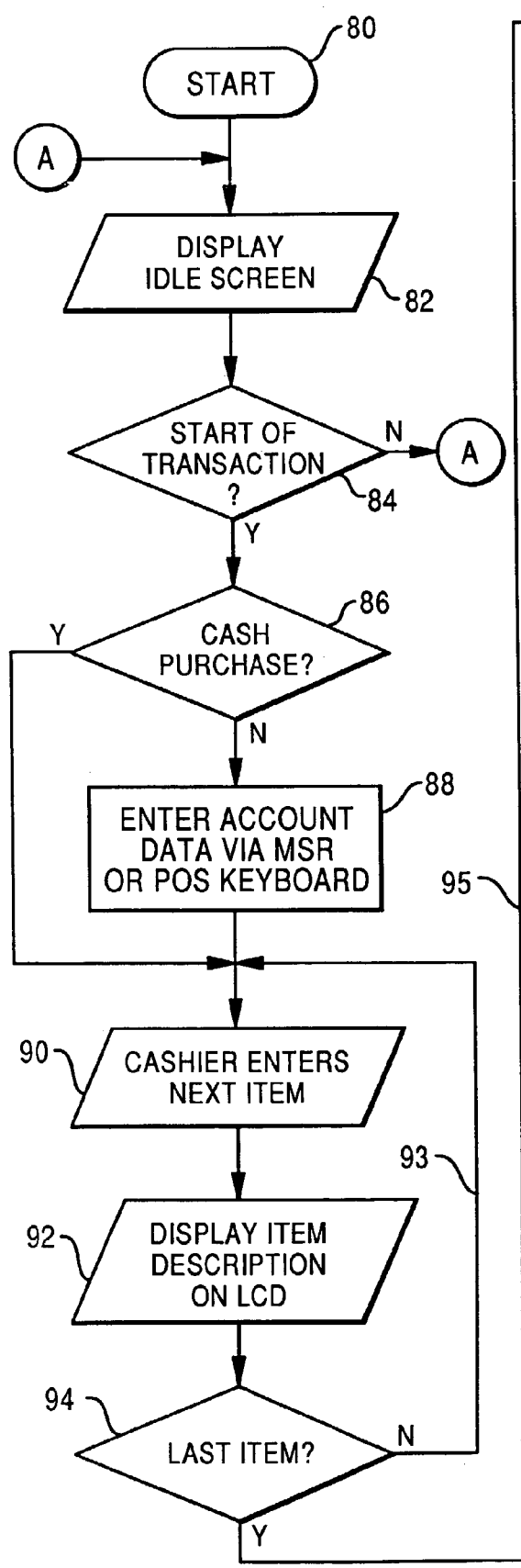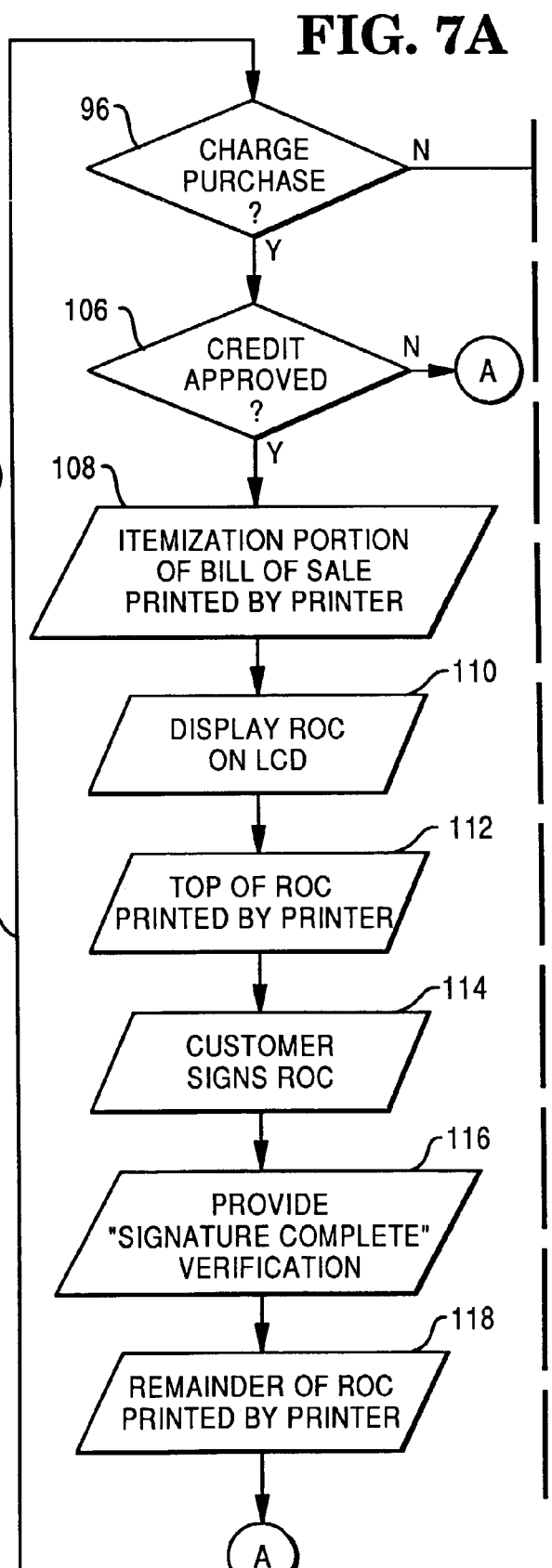
FIG. 7A

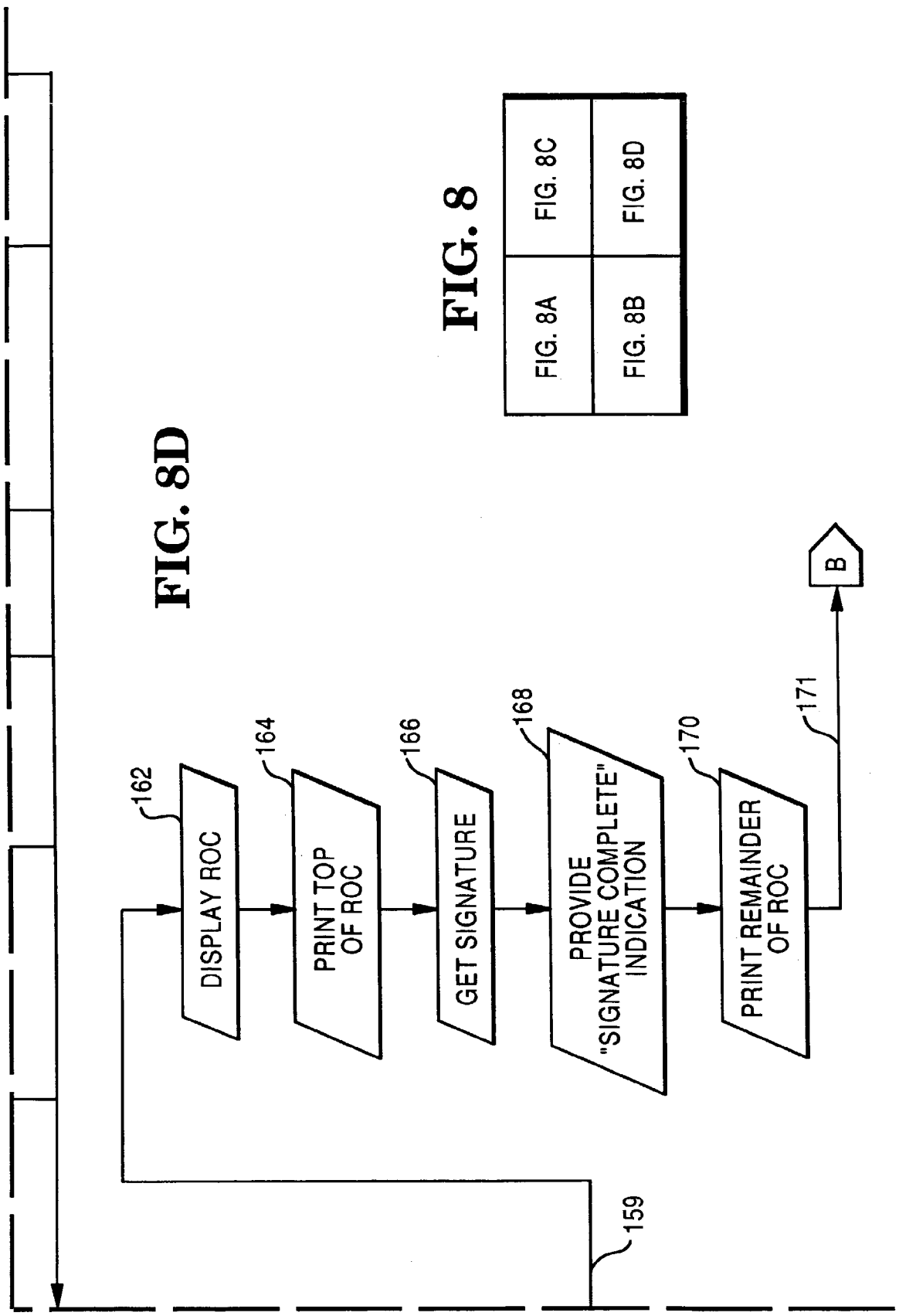

ID is a continuation of application Ser. No. 07/575,096, filed Aug. 30, 1990, now U.S. Pat. No. 6,539,363. The present application Ser. No. 10/300,118 claims the benefit of the filing date of application Ser. No. 07/575,096 under 35 USC 120.

WRITE INPUT TRANSACTION APPARATUS AND METHOD

The present application Ser. No. 10/300,118 is a continuation of application Ser. No. 07/575,096, filed Aug. 30, 1990, now U.S. Pat. No. 6,539,363. The present application Ser. No. 10/300,118 claims the benefit of the filing date of application Ser. No. 07/575,096 under 35 USC 120.

BACKGROUND OF THE INVENTION

This invention relates to a system and a method for processing signature-based payment transactions and more particularly relates to such a system and method in which the merchant's records of payment can be generated and maintained electronically without generation of paper records while providing paper records to customers when needed.

In retailing and similar areas, the volume of transactions is often such that management of paper records is becoming increasingly burdensome. This problem in the use of paper records is particularly noted in terms of storage of paper documents, retrieval of prior paper records which are needed at a later time, and use of the paper documents in authorizing and/or validating the transfer of funds. If the transfer of funds is disputed, the party responsible for maintaining the paper documents may be held liable for the amount of payment represented by the paper document in the event that such document cannot be located. A failure in ability to retrieve documents in a rapid, efficient manner may thus be costly to a merchant and/or a financial institution. In addition, the effort and facilities required to store paper documents for possible retrieval are costly. Furthermore, the delay which may be involved in processing paper documents through such a system in the event of a dispute may be costly and negative in terms of customer relations.

Another source of delay in the current processing of transactions at the point of sale is the time required for processing credit card transactions, including such time-consuming operations as inserting a customer card in an embossing device, performing the embossing operation, filling out the credit receipt blanks and obtaining a customer signature thereon. An arrangement by which all of the necessary information could be assembled and printed on a document in one operation would thus enhance efficiency at the point of sale station.

SUMMARY OF THE INVENTION

The present invention provides a method and system for generating a completed payment document ready for signature in image form, and further provides a means for capturing a customer signature by means of a stylus-activated mechanism and for integrating said signature into the document image. The resulting image may then be printed to provide a hard copy document for customer records, and may be stored and transmitted in electronic form to provide an electronic image for records maintained and used by the merchant and/or financial institution.

In accordance with one embodiment of the invention, a user activated terminal for the entry of transaction-related data comprises a housing for the terminal; a transparent digitizer positioned in the upper portion of the housing and capable of sensing and decoding data input to the digitizer by a user; a magnetic stripe reader for reading data from a record member; and display means positioned beneath the transparent digitizer for displaying data through the transparent digitizer, said data including data input to the digitizer and data sensed by said magnetic stripe reader.

In accordance with another embodiment of the invention, a system for processing transactions comprises a write input device which includes display means and transparent digitizer means for direct entry of data into the write input device by a user; a point of sale terminal on which item transactions can be entered and recorded; means coupling said point of sale terminal to said data sensing means of said write input device; a printer for printing records of transactions processed by said system; and a controller operatively coupled to said point of sale terminal, to said display means of said write input device, to said transparent digitizer means of said write input device and to said printer, whereby a receipt covering a transaction can be displayed on said write input device and printed by said printer.

In accordance with another embodiment of the invention, a method for processing customer charge transactions using apparatus which includes a cashier-operated point of sale (POS) terminal, a printer and a customer-operated write input device having a touch-sensitive display screen and a card reader, comprises the following steps:

(a) initiating the start of a transaction by the cashier;

(b) instructing the apparatus by the cashier as to whether an upcoming transaction is a cash transaction or a charge transaction;

(c) if the transaction is a charge transaction, entering customer account data;

(d) entering data concerning items of the transaction into the POS terminal by the cashier;

(e) indicating entry of the last item of the transaction by the cashier;

(f) displaying a business form on the display screen;

(g) signing by the customer on the display screen of the business form displayed there; and (h) printing of the business form including the customer signature.

It is accordingly an object of the invention to provide a method and system for processing signature-based payment transactions in an efficient manner.

Another object is to provide an improved method and system for processing signature-based payment transactions by use of electronic representations of payment documents.

Another object is to provide a method and system which are easily usable by and acceptable to a customer for generation and signature of a payment document in electronic form.

Another object of the invention is to provide a method and system for electronic generation and electronic signature of a payment document, and for maintaining an electronic representation of the signed document.

Another object is to provide a method and system for producing a paper record of the electronic representation of the document referred to in the object above.

Another object is to provide a user activated terminal for the entry of transaction-related data for use and storage in electronic form.

With these and other objects, which will become apparent from the following description, in view, the invention includes certain novel features of construction and combinations of parts, a preferred form or embodiment of which is hereinafter described with reference to the drawings which accompany and form a part of this specification.

BRIEF DESCRIPTION OF THE DRAWINGS

FIGS. 7A-7B, taken together, constitute a flow diagram of operation of a system which includes the write input apparatus.

FIG. 8 is a block diagram, showing how the FIGS. 8A-8D should be assembled.

FIG. 8A to 8D, taken together, constitute a flow diagram of the manner of operation of the controller of the system.

DETAILED DESCRIPTION

Figure 1:
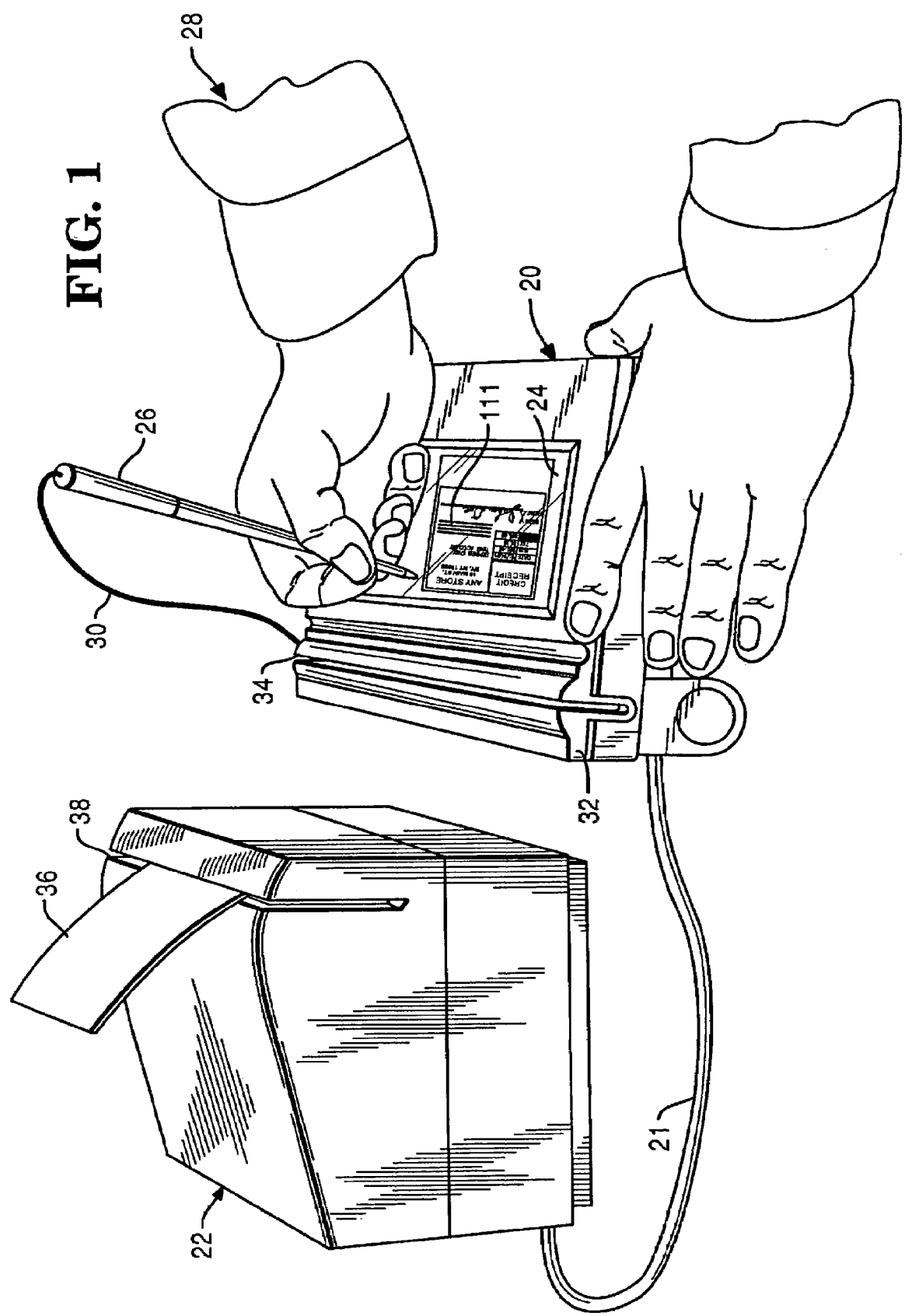
FIG. 1 is a perspective view of a write input apparatus and associated printer.

Referring now to FIG. 1, shown there is a perspective view of a write input apparatus 20 which is coupled to a printer 22 by a connector 21. Although this is shown as a direct connection or coupling, the actual coupling or connection may actually extend through one or more other devices, such as a controller, as will subsequently be described. The write input device includes a transparent surface 24 through which information may be displayed and on which information may be entered by writing thereon with a stylus 26 by a human operator 28. The stylus 26 is connected to the apparatus by an electrically conductive line 30. The apparatus 20 may also include an integral magnetic stripe reader 32 having a slot 34 through which a card bearing magnetic indicia may be swiped so that the data contained thereon can be inputted by, stored in and used by the system which includes the write input apparatus 20 and the printer 22. The write input device 20 can be configured without the magnetic stripe reader 32, if desired, in the event that the system which includes the apparatus 20 does not require such a reader, or incorporates a separate reader.

The printer 22 will most commonly be used for printing customer receipts such as the receipt 36 which is shown as issuing from an aperture 38 in the housing of the printer. Other types of record media could also be generated by the printer 22, if desired, in response to the needs of the system. Any suitable printer may be employed, such as an Epson RP265, marketed by Epson America, Inc., Torrance, Calif.

Figure 2:
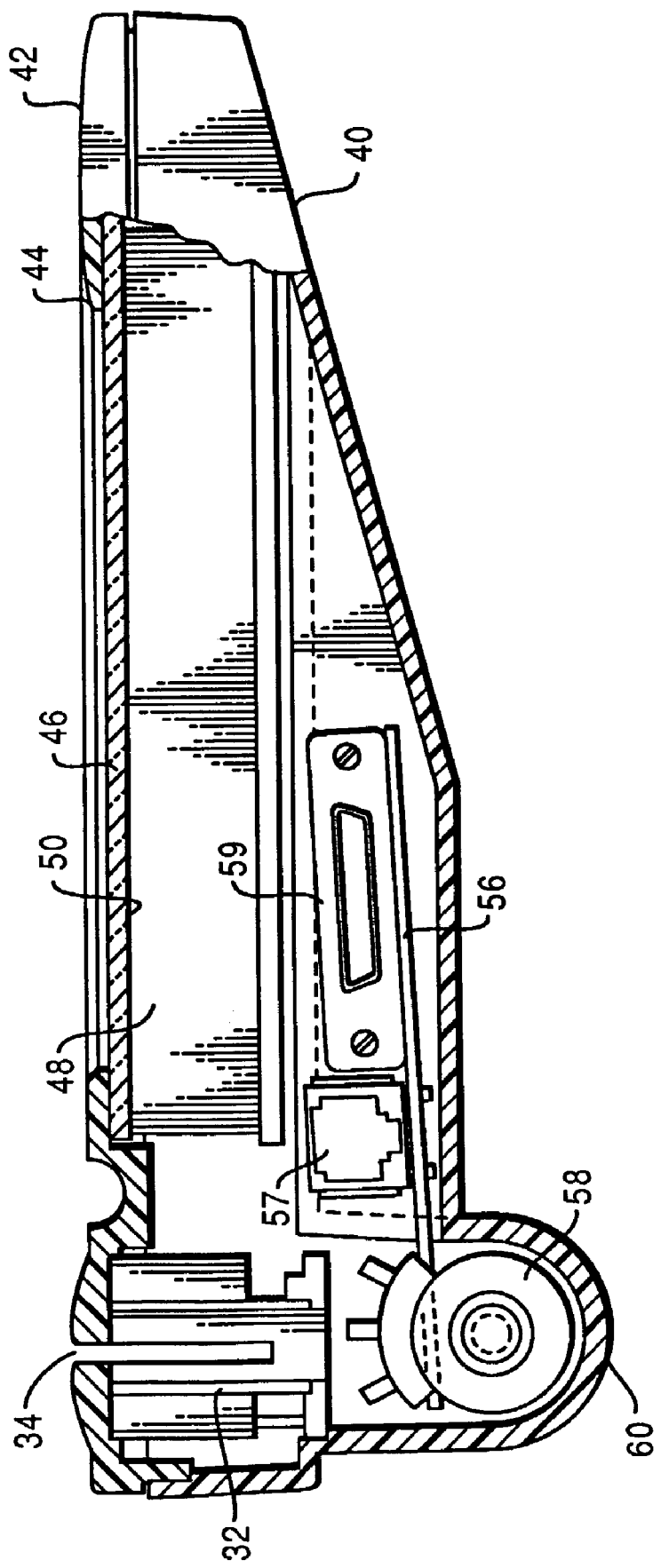
FIG. 2 is a sectional elevational view of the write input apparatus of FIG. 1.

As shown in the sectional view of FIG. 2, the write input apparatus 20 is contained within a lower housing 40 and an upper housing 42, which mate along the edges thereof. The upper housing 42 contains an aperture 44 within which is placed a transparent interactive digitizer element 46 which is capable of generating electrical signals which represent the position of the stylus 26 or other device placed in contact therewith. Broadly speaking, during operation of the interactive element 46, the stylus 26 acts as a probe and the differing potentials between sides of the element, in two coordinate directions, are measured, converted into digital form, and are processed through correction algorithms. This enables a trace of the movement of the stylus to be captured and retained, as well as displayed on a liquid crystal display (LCD) module 48. Interactive elements of this type are commercially available, and one such device which can be employed in the present invention is the ScreenWriter controller/digitizer/pen marketed by MicroTouch Systems Inc., Wilmington, Mass.

Positioned directly beneath the interactive transparent element 46 and having a display screen visible therethrough is the liquid crystal display (LCD) module 48 which is capable of displaying information in response to electrical signals applied thereto. Information from a card that is read by the magnetic stripe reader 32 can be used to enter information into the LCD module 48. For example, data from a sensed card can access a look-up table in a memory in a system using these devices to cause electrical signals for background lines for a receipt form to appear on the screen of the LCD module 48. Electrical signals from the interactive element 46 relating to movement of the stylus 26 on the element can then be applied to the LCD module 48 to provide a representation of a signature on the receipt form. Thus, since the LCD module 48 is positioned directly beneath the transparent digitizer element 46, the movements of the stylus 26 on the transparent surface 24 are graphically captured and are immediately visible at the points of contact of the stylus with the surface.

Figure 3:
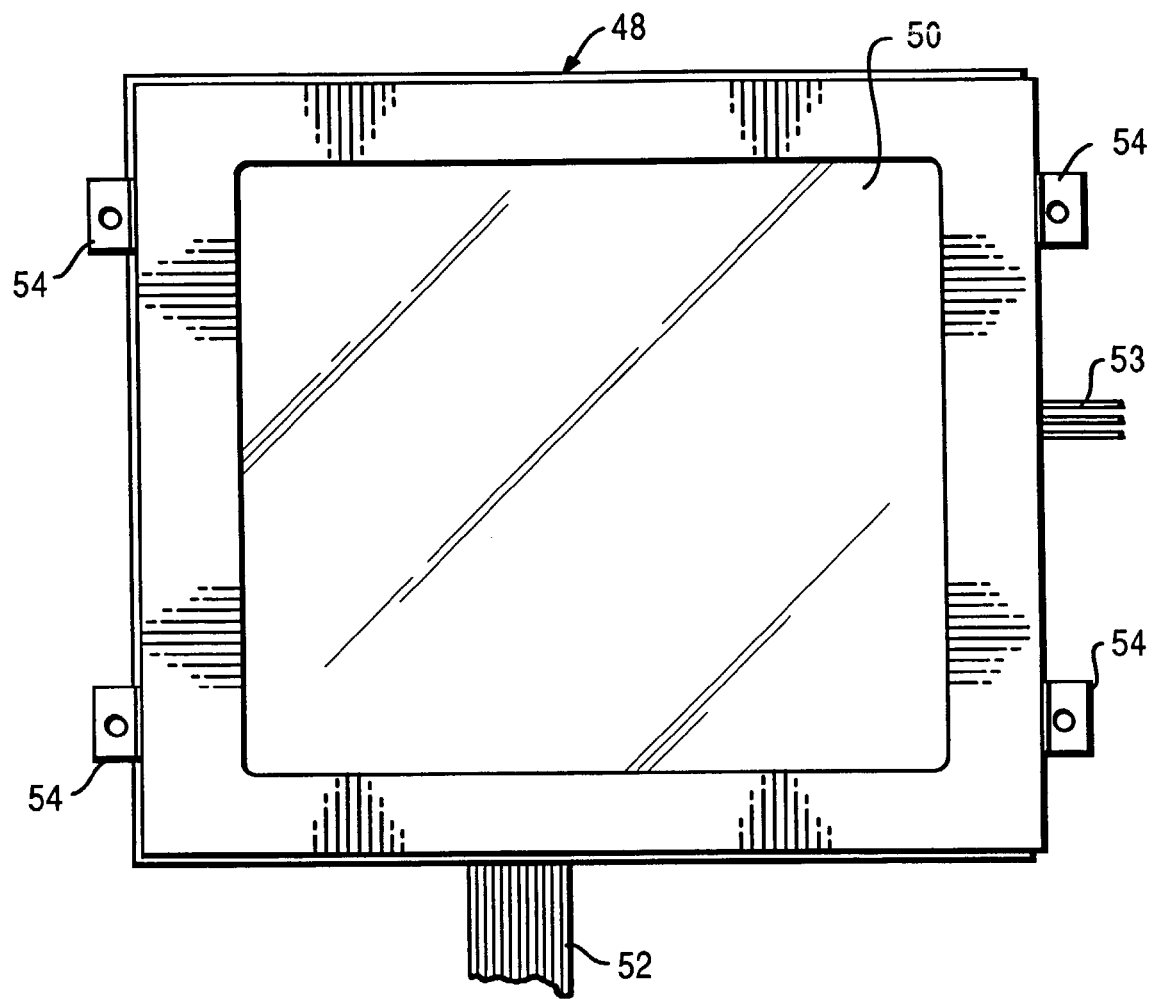
FIG. 3 is a plan view of a liquid crystal display module which is used in the write input apparatus.
Figure 4:
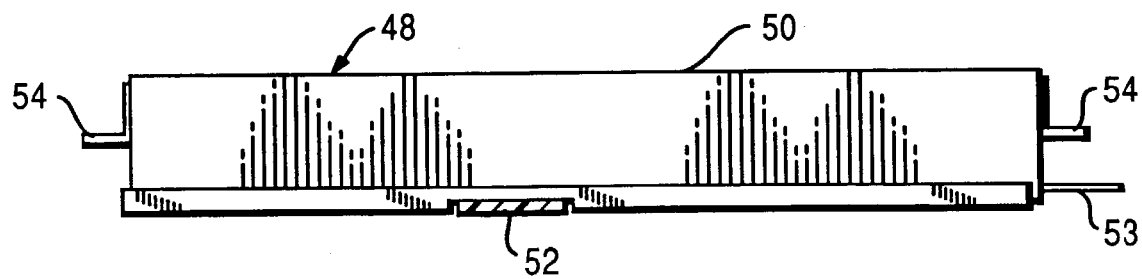
FIG. 4 is an elevational view of the liquid crystal display module of FIG. 3.

FIGS. 3 and 4 are plan and elevation views of the LCD module 48. A display screen 50 forms part of the top surface of the module. A cable 52 provides electrical input connections for supplying power and data signals to the module. Electrical conductors 53 provide power to fluorescent tubes for back-lighting the screen 50. Brackets 54 are secured to the module to enable it to be mounted securely within the apparatus 20. LCD modules of this type are commercially available, and one such module which can be employed in the present invention is Model EG7500, marketed by Epson America, Inc., Torrance, Calif.

The magnetic stripe reader 32 and its slot 34 are shown to be located in the upper left portion of the apparatus 20, as viewed in FIG. 2. A control circuit board 56 which functions as a controller for the transparent digitizer element 46 is located below the LCD module 48 in the lower housing 40 of the apparatus 20 and includes a connector 57 for connection to the digitizer element 46 and also includes an RS232 connector 59 to a PC controller 64. A contrast control 58 for changing the contrast of the screen 50 of the LCD module 48 is located in a semi-cylindrical lower extension 60 of the lower housing 40, which extension also serves as a foot or support for supporting the apparatus 20 on a work surface.

Figure 5:
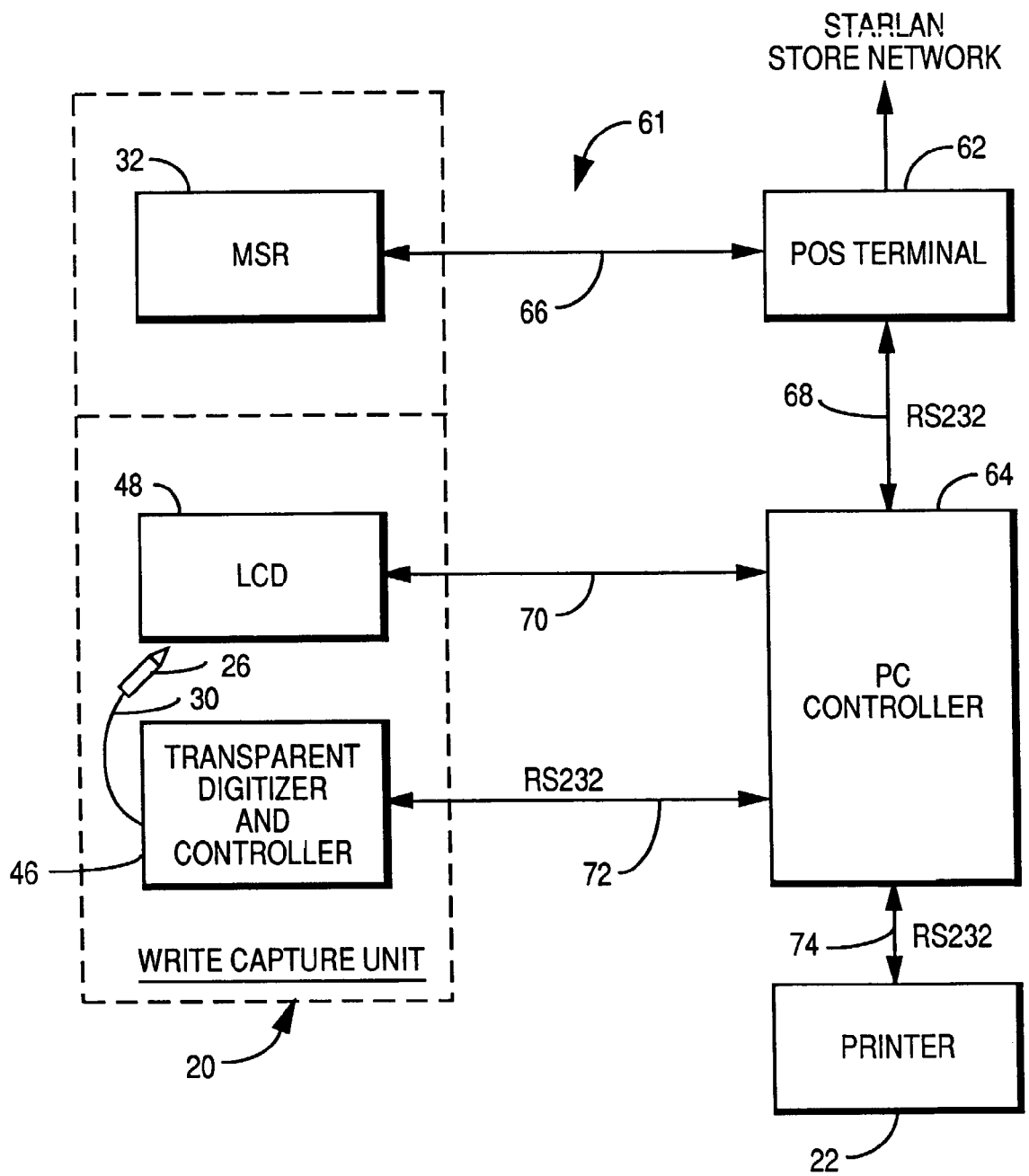
FIG. 5 is a block diagram of a system which includes the write input apparatus.

FIG. 5 is a block diagram of a system 61 which includes the write input apparatus 20 and the printer 22, in addition to the magnetic stripe reader 32, a point of sale (POS) terminal 62 and a personal computer functioning as a controller 64. The write input apparatus 20 is shown in block form in phantom lines, and includes the LCD module 48 and the interactive digitizer element and controller 46, with associated stylus 26. The magnetic stripe reader 32 is shown in a separate phantom line block, to indicate that it may be a separate freestanding device, rather than being integrated into the housing of the write input apparatus 20, if desired. The POS terminal 62 can be any suitable device of that type, such as a Class 7052 terminal, marketed by NCR Corporation, Dayton, Ohio. The personal computer 64 which functions as a controller may be any suitable personal computer, such as a Model PC 810, marketed by NCR Corporation, Dayton, Ohio. A Display Master model YDM6420 graphics adapter, marketed by Yahama Corporation of America, San Jose, Calif., is incorporated into the computer 64, and functions to drive the LCD module 48. An NCR Corporation part no. 017-0035367B RS 232 adapter board adds required additional serial ports for communications.

The magnetic stripe reader 32 is connected via a path 66 to the POS terminal 62, which is in turn connected by an RS232 data bus 68 to the PC controller 64. The LCD display 48 is connected via a path 70 to the PC controller 64, and in effect takes the place of the CRT display which would normally be associated with the PC. The touch screen and controller 46 is connected to the PC controller 64 by an RS232 data bus 72, and a similar RS232 data bus 74 connects the PC controller 64 to the printer 22. The POS terminal 62 may be connected to other data processing facilities in an establishment in which it is used, such as a STARLAN store network.

Figure 7B:
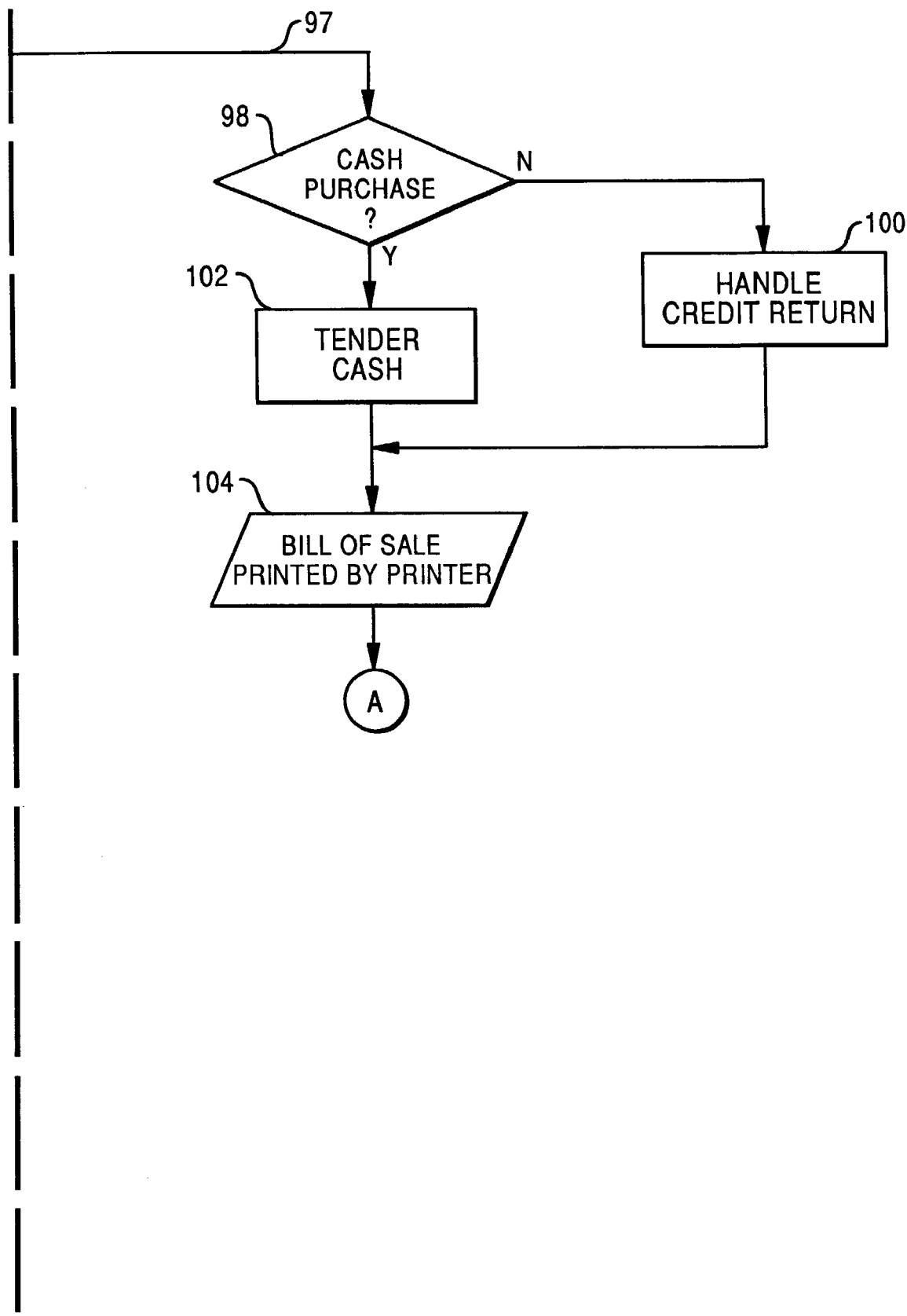
Figure 8A:
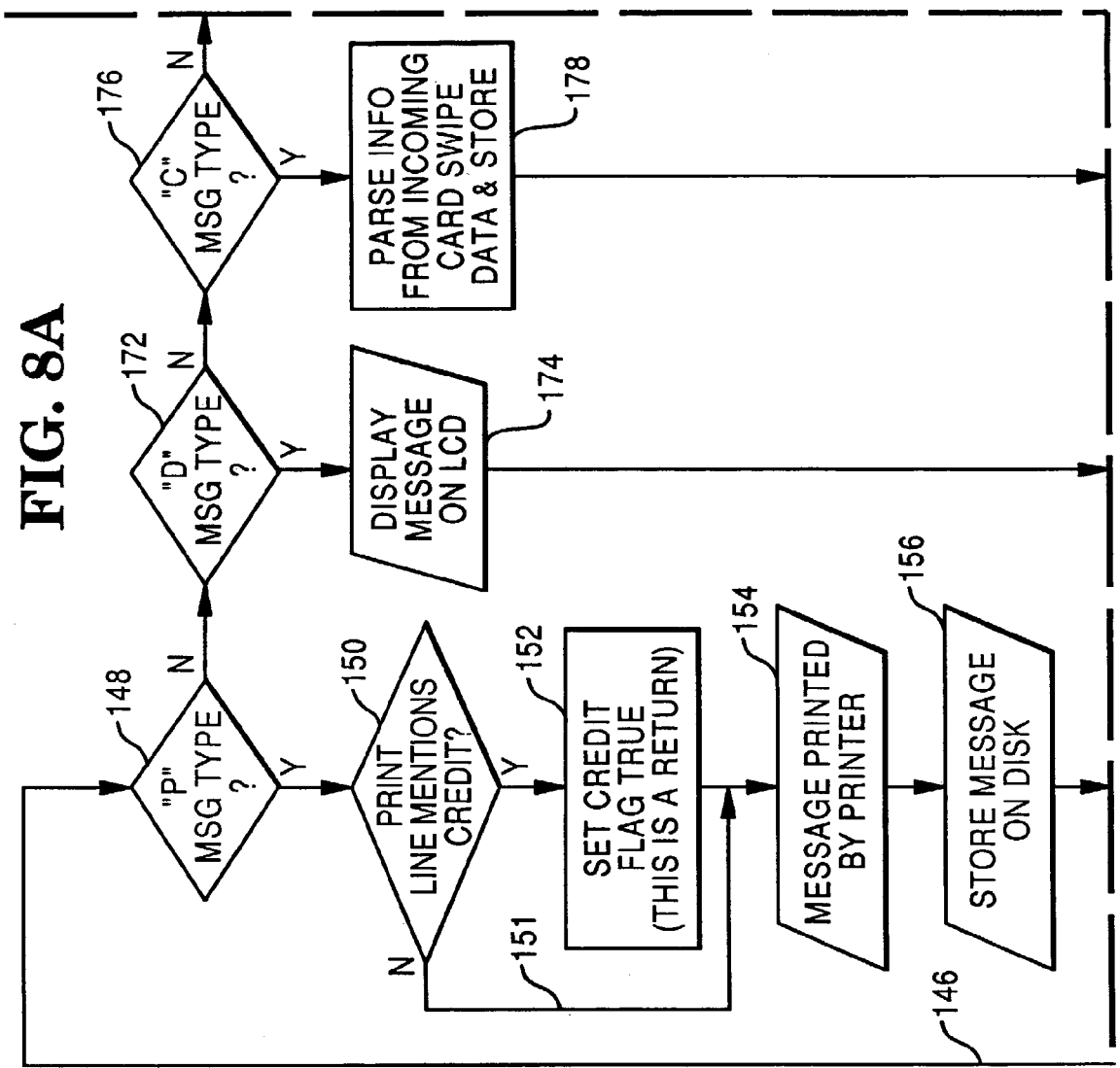
Figure 8B:
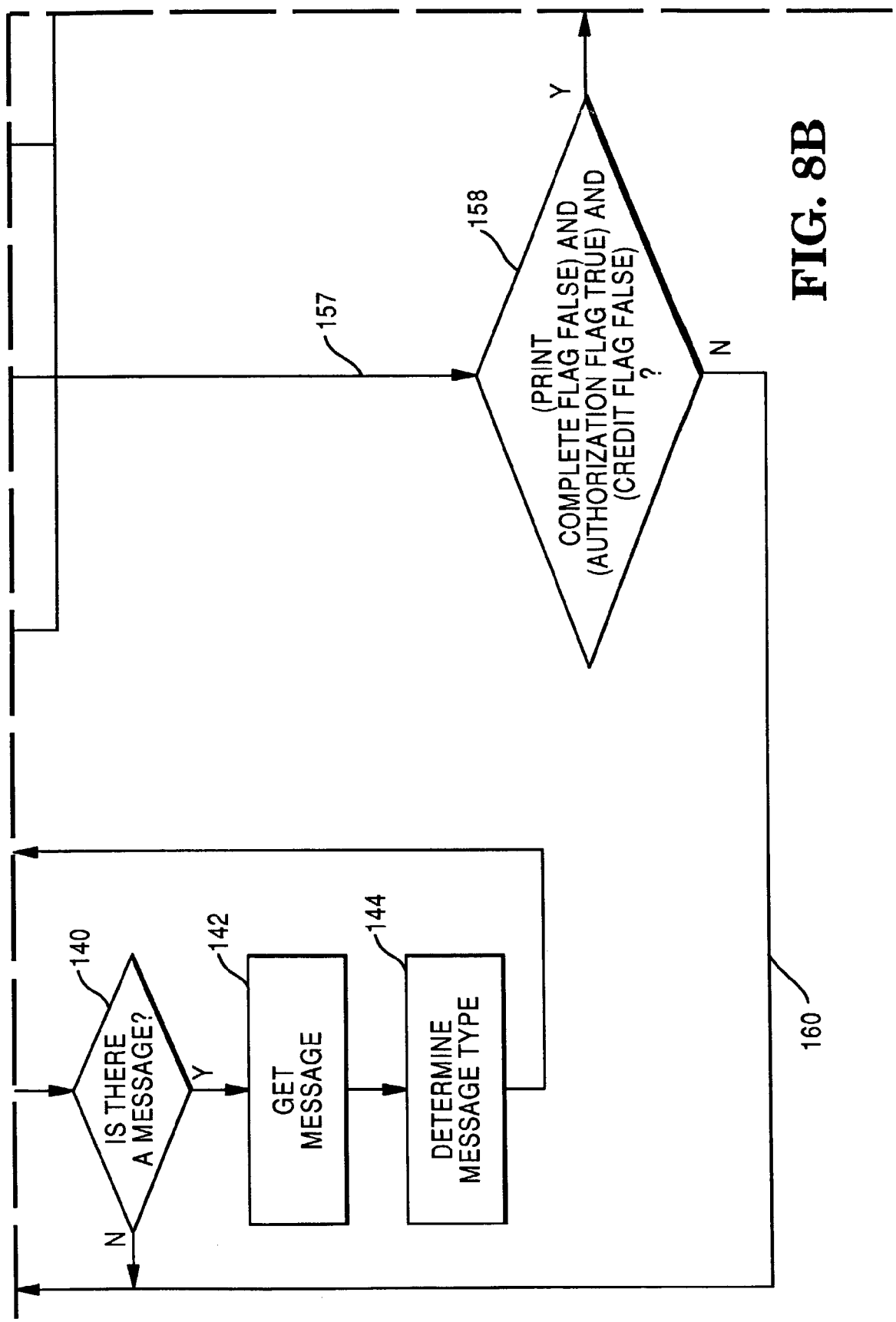
Figure 8C:
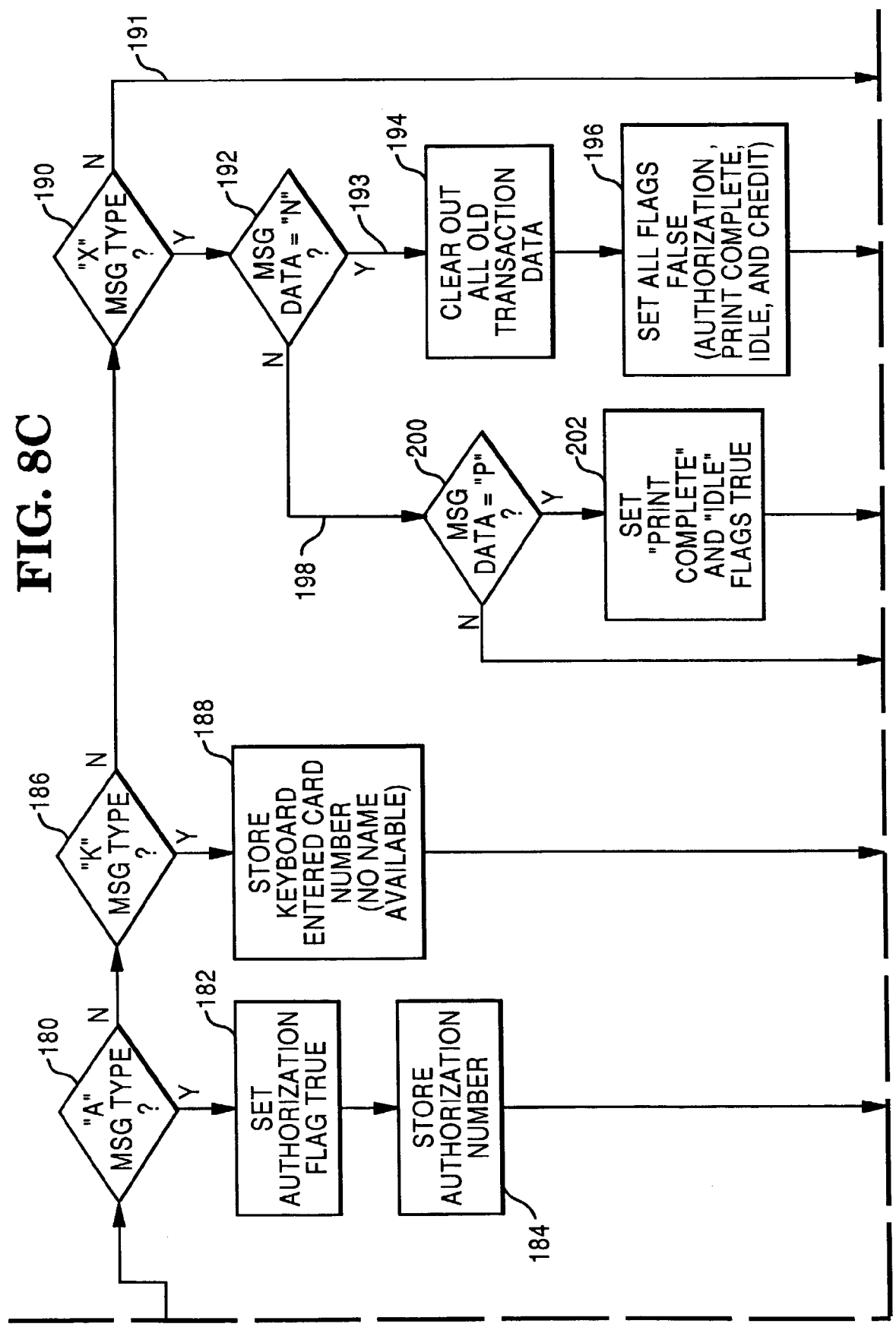

The manner in which the system 61 functions in performing transactions will now be described with reference to the flow diagram of FIGS. 7A and 7B. The process is shown in FIG. 7A as commencing with the start block 80. The display screen is initially in an idle condition, as represented by block 82. In this idle condition, advertising or other messages can be displayed if desired. The system periodically inquires as to whether a transaction has started, as represented by block 82. If not, the process returns via node A to start block 80 and displays an idle screen. If a transaction has commenced, the process continues to block 86, in which it is determined whether or not it is a cash purchase. If it is not a cash purchase, it is assumed that the transaction is a credit transaction, and a credit card is swiped through the magnetic stripe reader by the cashier, or account data is entered through the keyboard of the POS terminal 62, as represented in block 88, and the process continues to block 90. If the transaction is a cash purchase, the process goes directly to block 90, in which the cashier enters the next item into the terminal 62. The item is then displayed on the LCD 48 for the customer to see, as represented by block 92. An inquiry is made (block 94) as to whether this is the last item. If not, the process looks along path 93 for the entry of additional items via blocks 90 and 92, until the last item is reached, and the process continues along path 95 to block 96, in which an inquiry is again made as to whether or not the transaction is a charge purchase.

Let it first be assumed that the transaction is not a charge purchase, in which case the process continues over path 97 to decision block 98, in which inquiry is made as to whether the transaction is a cash purchase. If it is a cash purchase, the cash is tendered by the customer (block 102). If it is not a cash purchase, then the transaction must be some type of return, which is handled according to normal store procedure (block 100). In either event, a bill of sale for the customer is then printed (block 104) and the process returns to the start position via node A.

Returning now to block 96, let it be assumed that the transaction is a charge purchase, in which case the process continues to block 106, in which credit approval is verified in accordance with normal store procedures. If credit is not approved, the transaction is aborted and the process returns via node A to the start position. If credit is approved, the itemization portion of a bill of sale is printed for the customer by the printer 22, as represented in block 108, but it should be noted that the bill of sale is not yet complete. The receipt of charge (ROC) is then displayed (block 110), as shown by reference character 111 (FIG. 1) on the LCD display 48 and is visible through the transparent surface 24 of the write input apparatus 20. Next, the top portion of the receipt of charge is printed by the printer 22 (block 112) following the itemization portion of the bill of sale mentioned above.

Figure 6:
FIG. 6 is a view showing a document comprising a combined bill of sale and store receipt which is printed by the printer.

The customer then "signs" the representation of the receipt of charge (ROC) document which is visible through the surface 24. As noted above, the signature appears on the representation of the ROC as it is made by the stylus. This is represented by block 114. From block 114 the process continues to block 116 in which a "signature complete" verification is provided, verifying that the act of signing by the customer has been completed. This may be accomplished by the cashier depressing a designated key on the terminal or touching a designated area on the digitizer surface by the stylus 26. Following this, the remainder of the receipt of charge (ROC), which includes the customer signature, is printed by the printer and issued to the customer, as represented in block 118. The document will be similar in appearance to the document 117 shown in FIG. 6. The process then returns to the start position through node A.

The manner in which the software which controls the operation of the PC controller 64 functions will now be described in connection with the flow diagram of FIGS. 8A-8D. A typical transaction of the system 61 is made up of a series of messages sent from the terminal 62 to the PC controller 64 via the RS232 bus 68.

All messages are formatted in the following manner. The message starts with a standard ASCII start of header (SOH) character; followed by a count of the member of bytes to follow; followed by the message type character, which in this case could be an ASCII "P", "D", "C", "A", "K" or "X" character. Message type is followed by an ASCII start of text character (STX); followed by data appropriate for the message type; followed by an ASCII end of text character (ETX); followed by a binary check character (BCC) for the entire message.

The different types of messages include the following. One message type is the "P" message which contains itemization data, etc; to be printed by the printer 22. A "D" message contains itemization and description for the products for display on the LCD module as they are being entered by the cashier. A "C" message contains the data which was inputted during a swipe of the customer card through the magnetic stripe reader 32. An "A" message indicates that credit has been approved and contains the credit approval number. A "K" message contains a keyboard-entered credit card number as might be required if the credit card cannot be properly read by the magnetic stripe reader 32. An "X" message is a transaction status message. If an "X" message contains an ASCII "N" in its data field, this indicates the start of a new transaction, as well as a possible abortion of the last transaction. An "X" message whose data field contains an ASCII "P" indicates that all printing for the current transaction is complete.

The sequence of messages for a charge transaction would commonly be as follows. The sequence would commence with an "X" message containing an "N" data field; followed by a "K" or "C" message depending on how the credit card number was entered; followed by several "D" messages, one for each item line; followed by an "A" message; followed by several "P" messages, one for each line of text to be printed by the printer; and terminated by an "X" message with a "P" data field.

The sequence of messages for a cash transaction would be essentially the same as that for a charge transaction except that no "K", "C" or "A" messages would be included.

Referring now to FIGS. 8A to 8D, the PC controller software operation commences with a start block 130. First, any required hardware and software initializations are performed, as represented by block 132, after which all previous transaction data (such as credit card numbers, names, etc.) are flushed from memory, as represented in block 134. An inquiry is made as to whether the idle flag is set to true in decision block 136. The idle flag is true when a transaction is not in progress. If the idle flag is true, then the idle screen is displayed by the LCD module 48, as represented by block 138. If the idle flag inquiry of block 136 is false, block 138 is skipped and the process continues via path 137. In either case, the process continues to block 140 where an inquiry is made as to whether a message has been received in a message buffer in the PC controller 64. If no message has been received, the process loops back via path 160 to block 136. If a message has been received, the process continues to block 142 where the message is retrieved, and then to block 144, where the message type is determined.

The process then continues via path 146 to block 148, where an inquiry is made as to whether the message is a "P" type of message. If so, the process continues to block 150 where an inquiry is made as to whether the print line contained in this message includes the word "credit" or a similar key phrase which would indicate a return as opposed to a purchase. If such mention is made, a credit flag is set (block 152). If no such mention is made, the process continues on path 151.

In either case, in the next step of the process, the contents of the message are printed by the printer, as represented in block 154. Following this, the message is stored to disk by the PC controller 64 for possible later retrieval, as represented by block 156. The process then continues via path 157 to block 158, where an inquiry is made as to whether a "print complete" flag is false; whether an "authorization" flag is true; and whether the "credit" flag is false. The "print complete" flag is true when all "D" messages for this transaction have been transmitted. The "authorization" flag is true when credit authorization has been confirmed. The "credit" flag was previously described in connection with block 152. If the "print complete" flag is not false, or if the "authorization" flag is not true or if the "credit" flag is not false, the process returns via path 160 to block 136.

Otherwise the process continues via path 159 to block 162 in which the receipt of charge (ROC) is displayed on the LCD module 48. Following this, the top portion of the receipt of charge (ROC) is printed by the printer 22, as represented by block 164. The process continues to block 166, where the signature is made by the customer, inputted by the digitizer and simultaneously displayed by the LCD module 48. A "signature complete" indication is then provided as previously described in connection with block 116, and the remainder of the ROC, including the signature, is printed, as represented in block 170. The process then continues via path 171 and node B to block 134.

Returning to block 148, if the message is not of type "P", the process continues to block 172 where an inquiry is made as to whether the message is of type "D". If so, the contents of the "D" message are displayed on the LCD module 48 in block 174. The process then continues via path 157 to block 158, from which block the process has been previously described.

Returning to block 172, if the message is not of type "D", an inquiry is made (block 176) as to whether the message is of type "C". If so, the data sensed from the customer card by the magnetic stripe reader 32, which is contained in the data field of the "C" message, is parsed into individual name, account number, etc., fields and stored for later use. The process then continues via path 157 to block 158, from which block the process has been previously described.

Returning to block 176, if the message is not of type "C", the process continues to block 180 where an inquiry is made as to whether the message is of type "A". If so, the authorization flag is set true (block 182) and the authorization number is stored for later use (block 184), after which the process continues via path 157 to block 158, from which block the process has been previously described.

Returning to block 180, if the message is not of type "A", an inquiry is made as to whether the message is of type "K". If so, the keyboard-entered card number contained in the "K" message data field is stored for later use (block 188). The card holder's name is not generally entered in the case of keyboard card entry. The process then continues via path 157 to block 158, from which block the process has previously been described.

Returning to block 186, if the message is not of type "K", an inquiry is made as to whether the message is of type "X" (block 190). If so, an inquiry is made as to whether the data field of the "X" message is an ASCII "N".

If so, the process continues via path 193 to block 194, in which all previous transaction data (such as credit card numbers, names, etc.) are flushed from the memory. Following this, all flags are set false, including the "authorization" flag, the "print complete" flag, the "idle flag" and the "credit" flag. The process then continues via path 157 to block 158, from which block the process has been previously described.

Returning to block 192, if the "X" message data is not an ASCII "N", the process continues via path 198 to block 200, where an inquiry is made as to whether the "X" message data is an ASCII "P". If so, "print complete" and "idle" flags are set true, and the process continues via path 157 to block 158, from which block the process has been previously described. If, in block 200, the "X" message data is not an ASCII "P", this "X" message is not of a known type, and the process continues via path 157 and block 158.

Returning to block 190, if the message is not of type "X", it is not of a known type and the process continues via paths 191 and 157 to block 158, from which block the process has previously been described.

In order to display on the LCD module 48 the signature or other indicia generated by use of the stylus 26 on the transparent digitizer 46, it is necessary for the PC controller 64 to transform the stylus coordinates originating from the digitizer controller into coordinates of the LCD module 48. This is an important part of the process used to complete blocks 166 and 168 of FIG. 8D.

Figure 9:
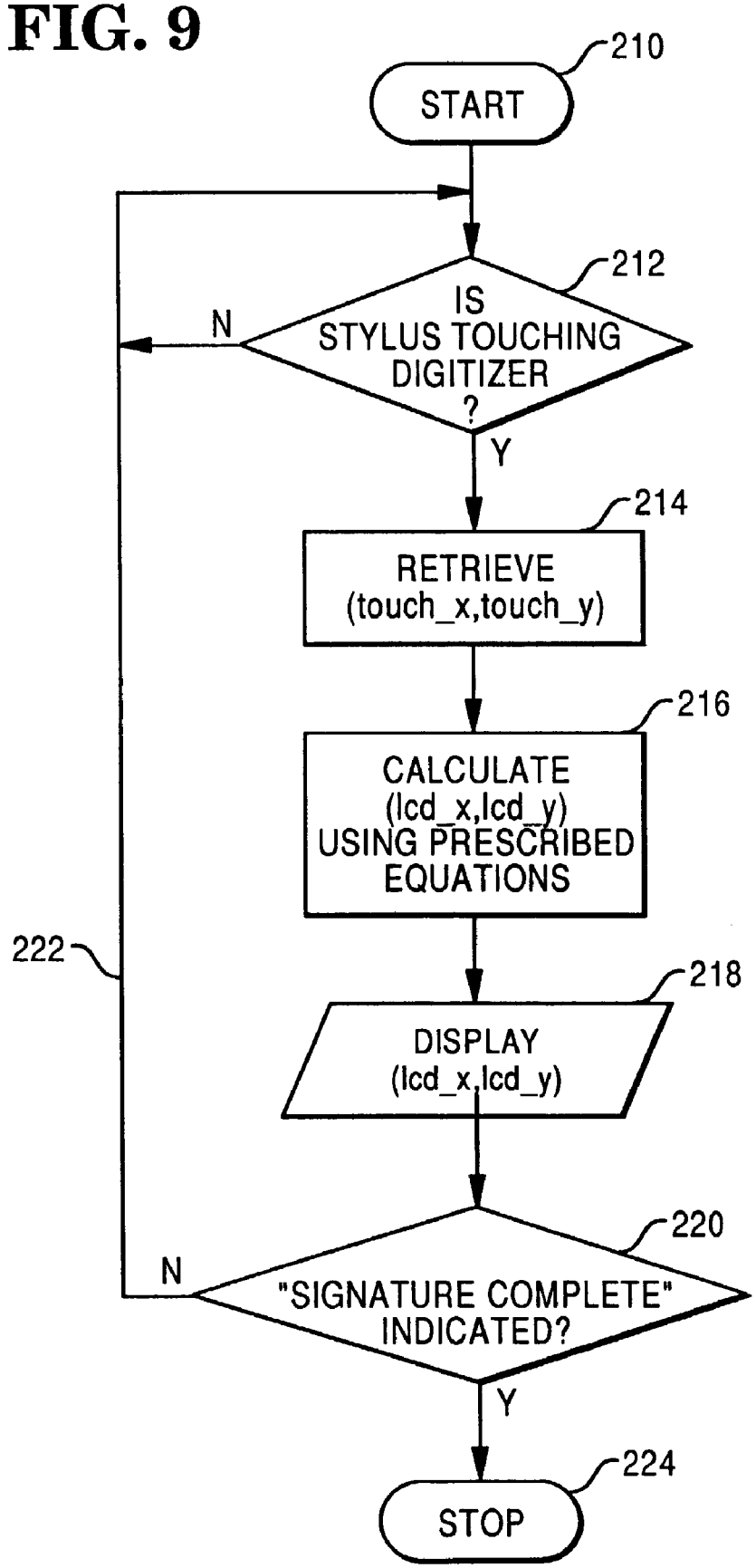
FIG. 9 is a flow diagram of the process employed to transform the coordinates of a position of the transparent digitizer to the corresponding coordinates of the display module.
Figure 10:
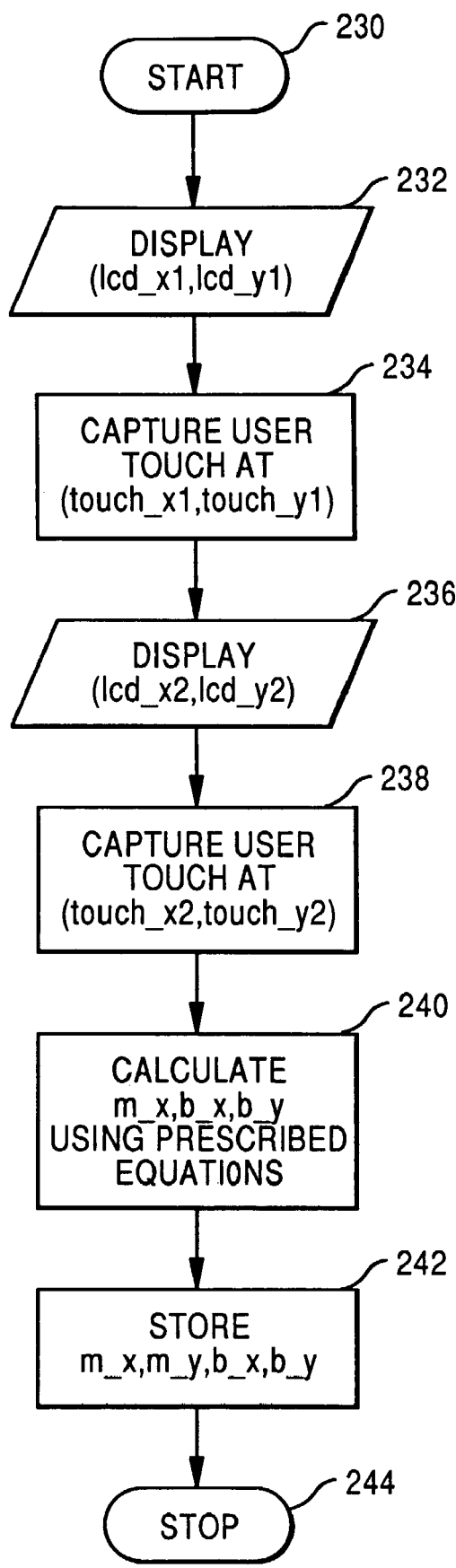
FIG. 10 is flow diagram of the process employed to provide offset values used in the process of FIG. 9.

The process used to accomplish this transformation is illustrated in the flow diagram of FIG. 9. Performance of this process is dependent upon obtaining certain constants which are used in equations for this transformation. The process for obtaining these constants is shown in FIG. 10, which will be subsequently described.

The process of FIG. 9 begins with start block 210, and then proceeds to block 212 in which an inquiry is made as to whether the stylus 26 is touching the digitizer 46. The process does not continue until the stylus does touch the digitizer. When this stylus is touching the digitizer, the process continues to block 214, in which the transparent digitizer coordinates "touch_X" and "touch_Y" are determined and transmitted by the digitizer controller via the RS232 bus to the PC controller 64 from the transparent digitizer controller included in block 46. These coordinates represent the instantaneous position of the stylus 26 on the digitizer 46, taken at periodic time intervals during movement of the stylus.

The corresponding positional coordinates "lcd_x" and "lcd_y" for the LCD module 48 are then calculated from "touch_X" and "touch_Y", as represented in block 216. This transformation is accomplished by use of the following equations:

$$lcd\_x = m\_x \text{ times } touch\_x + b\_x \qquad 1.$$

$$lcd\_y = m\_y \text{ times } touch\_y + b\_y \qquad 2.$$

where
- lcd_x, lcd_y are display coordinates,
- touch_x, touch_y are digitizer coordinates,
- m_x, m_y are scalar constants,
- b_x, b_y are offset constants.

The method for determining m_x, m_y, b_x and b_y will subsequently be described in connection with the flow diagram of FIG. 10.

The process continues to block 218 where lcd_x and lcd_y are described on LCD module 48. An inquiry is then made (block 220) as to whether a "signature complete" indication has been made, which was described in greater detail in connection with block 116. If the signature is complete, the process is concluded (block 224). If the signature is not complete, the process continues via path 222 to block 212.

The constants m_x, m_y, b_x and b_y are determined in accordance with the process set forth in the flow diagram of FIG. 10, which proceeds from the start position 230 to first display a point at predetermined LCD module screen coordinates "lcd_x1" and "lcd_y1", as represented in block 232. The user then touches this displayed point with the stylus 26, thus yielding corresponding digitizer coordinates "touch_x1" and "touch_y1", as represented in block 234. A second predetermined point, physically spaced from the first predetermined point, at coordinates "lcd_x2" and "lcd_y2" is then displayed (block 236). The user then touches this second displayed point with the stylus 26, thus yielding corresponding digitizer coordinates "touch_x2" and "touch_y2", as represented in block 238. For maximum accuracy, the two predetermined points should be at opposite corners of the planned active area of the screen of the LCD module 48.

The quantities m_x, m_y, b_x and b_y are then determined, as represented in block 240, in accordance with the following equations $$m\_x = \frac{(lcd\_x1 - lcd\_x2)}{(touch\_x1 - touch\_x2)} \qquad 3.$$

$$4. \; b\_x = lcd\_x1 - m\_x \text{ times } (touch\_x1) \qquad 4.$$

$$m\_y = \frac{(lcd\_y1 - lcd\_y2)}{(touch\_y1 - touch\_y2)} \qquad 5.$$

$$b\_y = lcd\_y1 - m\_y \text{ times } (touch\_y1) \qquad 6.$$

These constants (m_x, m_y, b_x and b_y) are then stored and used to calculate display coordinates from any subsequent digitizer coordinates, as per block 242. The process is then concluded at block 244.

The system and method of the present invention have been disclosed herein primarily in connection with an arrangement for signature-based payment transactions. However the invention is not limited to such an arrangement and could be used in connection with other arrangements in which a capability for integrating information from various sources with handwritten information on a display and printing and electronic storage of such integrated information would be useful. Such other arrangements might include, for example, the integration on a display of a guest check format with handwritten item entries thereon. Such a device could be carried by a waiter in a restaurant, and could also be used for generation of a bill which would be signed by a customer at the table. Another such arrangement could include the integration on a display of a check format with hand-written check signature to facilitate the generation of a check on a check-writing stand.

While the form of the invention shown and described herein is admirably adapted to fulfill the object primarily stated, it is to be understood that it is not intended to confine the invention to the form or embodiment disclosed herein, for it is susceptible of embodiment in various other forms within the scope of the appended claims.

What is claimed is:

1. An electronic signature capture device, comprising:
   a digitizer adapted to be located at a point-of-sale station in a store in which a customer participates in a transaction;
   circuitry for coupling said digitizer to a computer located at said point-of-sale station;
   wherein said digitizer is further adapted to receive and electronically capture a handwritten signature of the customer in the course of said transaction to thereby allow a captured handwritten signature to be electronically stored along with information pertaining to said transaction in a manner that does not require said store to maintain a paper record of said transaction.

2. The electronic signature device of claim 1, in which said digitizer is adapted to receive and electronically capture said handwritten signature in the course of said transaction to thereby allow said captured handwritten signature to be electronically stored in a manner to enable it to be graphically reproduced when needed as part of a paper record of said transaction.

3. The electronic signature capture device of claim 1, further including a display aligned with said digitizer, for displaying data during said transaction.

4. The electronic signature capturing device of claim 1, wherein said digitizer generates electrical signals which represent the position of a writing implement placed in contact with the digitizer when the customer signs his or her signature on said digitizer.

5. The electronic signature capture device of claim 4, in which said digitizer measures potentials on either side of said writing implement, converts said potentials into digital form, and determines the position of said writing implement on said digitizer in response to said potentials.

6. The electronic signature capture device of claim 1, wherein said digitizer is adapted to be located at a checkout station in a store in which a customer participates in a retail credit purchase transaction.

7. The electronic signature capture device of claim 6, wherein said information pertaining to said transaction includes a credit card account number, expiration date, the amount of said credit purchase and said captured handwritten signature.

8. An electronic signature capture device, comprising:
   a digitizer adapted to be located at a point-of-sale station in a store in which a customer participates in a transaction;
   means for connecting said digitizer to a computer located at said point-of-sale station;
   wherein said digitizer is further adapted to receive and electronically capture a handwritten signature of the customer in the course of said transaction to thereby allow a captured handwritten signature to be electronically stored along with information pertaining to said transaction in a manner that does not require said store to maintain a paper record of said transaction.

9. An electronic signature capture device, comprising:
   a portable digitizer adapted to be located at a place in which a customer participates in a transaction and to send handwritten signature information to a computer;

wherein said digitizer is further adapted to receive and electronically capture a handwritten signature of the customer in the course of said transaction to thereby allow a captured handwritten signature to be communicated to said computer and electronically stored along with information pertaining to said transaction in a manner that does not require said store to maintain a paper record of said transaction.

10. A system for electronically recording a transaction occurring at a point of sale station in a store in which a customer participates in a transaction, comprising:
an electronic computing and storage device which stores a record of said transaction occurring at said point of sale station in said store;
a digitizer coupled to said electronic computing and storage device at said point of sale station in said store, said digitizer electronically capturing a handwritten signature of the customer applied thereto during the course of said transaction, to provide a captured handwritten signature related to said record of said transaction; and
whereby said electronic computing and storage device electronically stores said captured handwritten signature along with said related record of said transaction, to thereby provide a signed receipt of said transaction in electronic form, whereby said signed receipt of said transaction can be electronically stored in a manner that does not require said store to maintain a paper record of said transaction.

11. The system of claim 10, wherein said signed receipt is electronically stored in a manner to enable it to be graphically reproduced when needed to form a printed and signed paper receipt.

12. The system of claim 11, further comprising a printer for printing said signed receipt of said transaction.

13. The system of claim 12, wherein said printer is located at said point of sale station.

14. The system of claim 13, wherein said printer prints said signed receipt at the time of said transaction.

15. The system of claim 10, further comprising a display aligned with said digitizer, for displaying data during said transaction.

16. The system of claim 10, wherein said digitizer generates electrical signals which represent the position of the writing implement placed in contact with the digitizer when the customer signs his or her signature on said digitizer.

17. The system of claim 16, in which said digitizer measures potentials on either side of said writing implement, converts said potentials into digital form, and determines the position of said writing implement on said digitizer in response to said potentials.

18. The system of claim 10, wherein said transaction is a retail credit purchase.

19. The system of claim 18, wherein said record of said transaction includes a credit card number, expiration date, the amount of said credit purchase, and said captured signature.

20. A system for electronically recording a transaction occurring at a place in which a customer participates in a transaction, comprising:
an electronic computing and storage device which stores a record of said transaction occurring at said place;
a digitizer coupled to said electronic computing and storage device, said digitizer electronically capturing a handwritten signature of the customer applied thereto during the course of said transaction and sending a captured handwritten signature related to said record of said transaction to said electronic computing and storage device; and
whereby said electronic computing and storage device electronically stores said captured handwritten signature along with said related record of said transaction, to thereby provide a signed receipt of said transaction in electronic form, whereby said signed receipt of said transaction can be electronically stored in a manner that does not require said store to maintain a paper record of said transaction.

21. A system for processing transactions, comprising:
a write input device which includes a display for displaying data and a digitizer for direct entry of handwritten signature data into the write input device by a user;
a point of sale terminal on which item transactions can be entered and recorded;
circuitry coupling said point of sale terminal to said digitizer of said write input device;
a printer for printing records of transactions processed by said system;
means for storing handwritten signature data; and
controller means for controlling a display of a receipt for a transaction on said display of said write input device and for printing a copy of the receipt including a signature on said printer, said controller means being operatively coupled to said point of sale terminal, to said display of said write input device, to said digitizer of said write input device, to said storing means and to said printer, whereby a receipt relating to a transaction can be displayed on said display of said write input device and printed by said printer.

22. An electronic signature capture device, comprising:
a digitizer adapted to be located at a place in which a customer participates in a transaction;
circuitry for coupling said digitizer to a computer for recording data pertaining to the transaction;
wherein said digitizer is further adapted to receive and electronically capture a handwritten signature of the customer in the course of said transaction to thereby allow a captured handwritten signature to be electronically stored along with data pertaining to said transaction; and
a display for displaying a representation of said signature.

23. The electronic signature capture device as recited in claim 22, wherein the display also displays a message notifying the customer of an obligation to pay.

24. The electronic signature capture device as recited in claim 22, wherein the display also displays a representation of a receipt.

25. The signature capture device as recited in claim 22, further comprising:
a card reader for recording entry of customer account information;
wherein the display also displays a message adjacent the representation of the signature notifying the customer of an obligation to pay.

26. The signature capture device as recited in claim 22, wherein the display displays promotional images to be viewed by a user.

27. A method of processing customer charge transactions comprising the steps of:
(a) recording an indication to start a transaction by a point-of-sale terminal;
(b) recording data concerning items of the transaction by the point-of-sale terminal;
(c) recording an indication of a last item of the transaction by the point-of-sale terminal;
(d) recording account data of a customer by the point-of-sale terminal;

(e) causing a business form which includes transaction item data to be displayed on a touch-sensitive display screen of a write input device by the point-of-sale terminal;
(f) recording a signature of the customer entered over the business form from the write input device by the point-of-sale terminal;
(g) communicating combined business form and signature information to a storage medium for later retrieval by the point-of-sale terminal;
(h) printing at least a portion of the business form displayed by the point-of-sale terminal.

28. The method of claim 27, further comprising the step of:
(i) causing the touch-sensitive display screen to display promotional material by the point-of-sale terminal.

29. The method of claim 27, wherein step d comprises the substep of:
(d-1) recording the account data of the customer from a card reader by the point-of-sale terminal.

30. The method of claim 27, wherein step d comprises the substep of:
(d-1) recording the account data of the customer from a keyboard by the point-of-sale terminal.

31. The method of claim 27, further comprising the step of:
(i) causing the touch-sensitive display screen to display a message notifying the customer of an obligation to pay by the point-of-sale terminal.

32. A method of processing customer charge transactions comprising the steps of:
(a) receiving an indication to display a business form which includes transaction item data from a point-of-sale terminal by a write input device;
(b) displaying the business form on a touch-sensitive display screen of the write input device;
(c) recording a signature of the customer entered over the business form on the touch-sensitive display screen by the write input device; and
(d) communicating combined business form and signature information to a point-of-sale terminal for storage and later retrieval by the write input device.

33. The method of claim 32, further comprising the step of:
(e) displaying promotional material on the touch-sensitive display screen by the write input device.

34. The method of claim 32, further comprising the step of:
(i) displaying a message notifying the customer of an obligation to pay on the touch-sensitive display screen by the write input device.

35. A method for processing transactions using an apparatus which includes a point of sale(POS) terminal and a customer operated write input device having a touch-sensitive display screen, comprising the following steps:
(a) initiating the start of a transaction;
(b) instructing the apparatus that an upcoming transaction is a credit transaction;
(c) entering customer account data relating to the transaction;
(d) entering data concerning items of the transaction including a last item into the POS terminal;
(e) indicating entry of the last item of the transaction;
(f) displaying a business form which includes transaction item data on the touch-sensitive display screen;
(g) signing by the customer on the touch-sensitive display screen of the business form displayed there; and
(h) communicating information representing said form including signature information from the signing by the customer on the touch screen to a storage medium for later retrieval.

36. A method for creating a credit receipt form at a point of sale station in a store in which a customer participates in a transaction using apparatus which includes a card reader and a write input device with an integrated display and digitizer, comprising the following steps:
(a) reading customer account data from a card by the card reader;
(b) accessing a look-up table in a memory to cause a particular receipt form to appear on the display in accordance with the particular customer account data read from said card;
(c) signing of a handwritten signature by the customer on the digitizer which is positioned in registry with the image of the receipt form displayed on the display; and
(d) storing in a storage medium of data representing said receipt form including said signature on said form.

37. A method for electronically recording a transaction, comprising:
(a) storing a record of a transaction occurring at a point of sale station in a store in which a customer participates in a transaction;
(b) providing a digitizer at said point of sale station in said store;
(c) requesting that said customer sign his or her handwritten signature on said digitizer at said point of sale station during the course of said transaction;
(d) electronically capturing said signature applied to said digitizer during the course of said transaction, to provide a captured handwritten signature related to said record of said transaction; and
(e) electronically storing said captured handwritten signature along with said related record of said transaction, to thereby provide a signed receipt of said transaction in electronic form, whereby said signed receipt of said transaction can be electronically stored in a manner that does not require the store to maintain a paper record of said transaction.

38. An electronic signature capture device, comprising:
a touch-sensitive display screen adapted to be located at a place in which a customer participates in a credit transaction;
circuitry for coupling said touch-sensitive display screen to a computer for recording data pertaining to the credit transaction;
wherein said touch-sensitive display screen is further adapted to receive and electronically capture said customer's signature in the course of said credit transaction to thereby allow said captured signature to be electronically stored along with data pertaining to said credit transaction; and
wherein said touch-sensitive display screen is further adapted to display transaction information and a message notifying the customer of an obligation to pay.

39. An electronic signature capture device, comprising:
a digitizer adapted to be carried in a restaurant in which a customer participates in a restaurant transaction;
circuitry for coupling said digitizer to a computer in the restaurant;
wherein said digitizer is further adapted to receive and electronically capture a handwritten signature of the customer in the course of said restaurant transaction to thereby allow a captured handwritten signature to be electronically stored along with information pertaining to said restaurant transaction in a manner that does not require said restaurant to maintain a paper record of said transaction.

40. The electronic signature device of claim 39, in which said digitizer is adapted to receive and electronically capture the handwritten signature of the customer in the course of said restaurant transaction to thereby allow said captured handwritten signature to be electronically stored in a manner to enable it to be graphically reproduced when needed as part of a paper record of said restaurant transaction.

41. The electronic signature capture device of claim 39, further including a display aligned with said digitizer, for displaying data during said restaurant transaction.

42. The electronic signature capture device of claim 41, wherein said display displays a guest check image.

43. The electronic signature capturing device of claim 39, wherein said digitizer generates electrical signals which represent the position of a writing implement placed in contact with the digitizer when the restaurant customer signs his or her signature on said digitizer.

44. The electronic signature capturing device of claim 43, in which said digitizer measures potentials on either side of said writing implement, converts said potentials into digital form, and determines the position of said writing implement on said digitizer in response to said potentials.

45. The electronic signature capturing device of claim 39, wherein said digitizer is adapted to be located at a table in a restaurant in which a customer participates in a credit purchase transaction.

46. The electronic signature capture device of claim 45, wherein said information pertaining to said credit purchase transaction includes a credit card account number, expiration date, the amount of said credit purchase transaction and said captured signature.

47. An electronic signature capture device, comprising:
a digitizer adapted to be carried to facilitate completion of a transaction;
circuitry for coupling said digitizer to a computer;
wherein said digitizer is further adapted to receive and electronically capture a handwritten signature in the course of said transaction to thereby allow a captured handwritten signature and information pertaining to said transaction to be transferred to the computer and electronically stored in a manner that does not require storage of a paper record of said transaction.

48. The electronic signature device of claim 47, in which said digitizer is adapted to receive and electronically capture said handwritten signature in the course of said transaction to thereby allow said captured handwritten signature to be electronically stored in a manner to enable it to be graphically reproduced when needed as part of a paper record of said transaction.

49. The electronic signature capture device of claim 47, further including a display aligned with said digitizer, for displaying data during said transaction.

50. The electronic signature capturing device of claim 47, wherein said digitizer generates electrical signals which represent the position of a writing implement placed in contact with the digitizer during signing of the signature on said digitizer.

51. The electronic signature capturing device of claim 50, in which said digitizer measures potentials on either side of said writing implement, converts said potentials into digital form, and determines the position of said writing implement on said digitizer in response to said potentials.

52. The electronic signature capturing device of claim 47, wherein said digitizer is adapted for use in a credit purchase transaction.

53. The electronic signature capture device of claim 52, wherein said information pertaining to said credit purchase transaction includes a credit card account number, expiration date, the amount of said credit purchase transaction and said captured handwritten signature.

54. An electronic signature capture device, comprising:
a display for displaying a check image;
a digitizer cooperatively located with the display for capturing a handwritten signature over the check image;
circuitry for coupling said digitizer to a computer;
wherein said digitizer is adapted to receive and electronically capture the handwritten signature in the course of a transaction to thereby allow a captured handwritten signature, check information, and transaction information to be transferred to the computer and electronically stored in a manner that does not require acceptance and storage of a paper check.

* * * * *